United States Patent [19]
Couvreur

[11] 3,807,261
[45] Apr. 30, 1974

[54] SHEET CUTTING AND MARKING

[75] Inventor: Jean-Marie Couvreur, Moustier-sur-Sambre, Belgium

[73] Assignee: Glaverbel S.A., Watermael-Boitsfort, Belgium

[22] Filed: Nov. 11, 1971

[21] Appl. No.: 197,672

[30] Foreign Application Priority Data
Nov. 13, 1970  Great Britain .................... 54149/70

[52] U.S. Cl. ........................... 83/6, 83/11, 83/12, 83/76, 83/326, 83/353, 83/575, 83/614
[51] Int. Cl. ....... B26d 3/08, B26d 5/20, C03b 33/02
[58] Field of Search ........... 83/326, 12, 6, 298, 353, 83/304, 11, 614, 575, 76

[56] References Cited
UNITED STATES PATENTS

| | | | |
|---|---|---|---|
| 2,283,838 | 5/1942 | Williams | 83/353 UX |
| 3,198,044 | 8/1965 | Clin | 83/12 X |
| 3,282,140 | 11/1966 | Sasabuchi et al. | 83/12 X |
| 3,485,128 | 12/1969 | Siegenthaler | 83/326 |
| 3,581,615 | 6/1971 | Kaneshige et al. | 83/6 X |
| 3,704,642 | 12/1972 | Dryon | 83/326 X |

Primary Examiner—Frank T. Yost
Attorney, Agent, or Firm—Spencer & Kaye

[57] ABSTRACT

A method and apparatus for cutting or marking sheet material along lines spaced from one another in one direction along the material, and extending at an angle to that direction, by driving at least one cutting or marking tool in one direction over an endless path along a guide oriented so that the tool can be operative on the material while traveling along a selected reach of the path which is transverse to the one direction, and establishing relative movement between the guide and the material in the one direction while the tool is operative on the material.

19 Claims, 11 Drawing Figures

SHEET CUTTING AND MARKING

BACKGROUND OF THE INVENTION

This invention relates to a method of marking or cutting sheet material along lines which are spaced from one another in one direction along the material and which are at an angle to that direction, each line being traced by a cutting or marking tool as the tool is driven along a guide disposed at an angle to the one direction and while the guide and the sheet material undergo relative displacement in the one direction towards a relative position appropriate for the commencement of the marking or cutting of a next line. The invention also relates to apparatus for performing this method.

For convenience, the general term "trace" is hereafter used to denote a movement of a marking or cutting tool by which the tool marks or cuts sheet material along a given line.

It is known to divide a stationary piece of flat glass into sections by a trace made by a cutting tool guided along a guide beam which can be moved from one position to another relative to the piece of glass. Each trace is made while the guide beam is stationary. After making one trace, the cutting tool is stopped and the beam is displaced to the position of the next trace, which the tool makes in the same direction as before or in the reverse direction. This method is not suitable for the high rates of output often required in modern industry. The maximum output rate is limited by the inertia of the beam and of the cutting mechanism.

It is also known to divide a ribbon of glass which is being continuously manufactured into successive rectangular sections as the ribbon moves through a cutting station, using a guide beam and cutter mechanism as set out above, by disposing the beam at right angles to the direction of the ribbon advance and moving the beam bodily in the direction and at the speed of the ribbon advance during each trace. The beam has to return to its original position after every trace and inertia problems again restrict the usefulness of the method.

Due to this inertia, the forces imposed on the beam control mechanism become prohibitive above certain ribbon speeds. It is for this reason that for modern flat glass production apparatus, in which ribbons of glass moving at speeds that may exceed 200 meters per hour, and may even reach 600–800 meters per hour or more, have to be cut into blanks which may be of the order of only 2 meters in length, it has become necessary to seek alternative cutting systems.

SUMMARY OF THE INVENTION

It is therefore one subject of the present invention to provide a method of cutting or marking off sheet material into successive pieces or sections, which permits higher output rates than have been heretofore achievable.

According to the present invention, there is provided a method of marking or cutting sheet material along lines which are spaced apart in one direction along the material and which are at an angle to that direction, each line being traced by a cutting or marking tool being driven along a guide disposed at an angle to the one direction while this guide and the sheet material undergo relative displacement, parallel to one direction, towards a relative position appropriate for the commencement of the marking or cutting of a next line, which method is performed by a tool driving mechanism which drives at least one marking or cutting tool over an endless path along the guide, and at least one marking or cutting tool which is continuously driven by the mechanism so as to traverse the path repeatedly in one direction and which is operative on the material over part of that path during at least some of such traversals thereof.

It is an important advantage of this method that the tool driving mechanism is kept in continuous, uninterrupted operation during a period in which successive traces are effected. The or each tool is driven from the beginning to the end of a trace and, without interruption of the motion of the tool along its endless path, the tool is returned along the guide and makes another trace. Moreover, the speed of the tool or tools can be made optimum for its operation, from start to finish of the traces. This is of special importance when cutting ribbons or pieces of sheets and is in contrast to prior art methods in which the or each cutting tool has to commence cutting while accelerating from rest.

According to certain embodiments of the invention the sheet material is moved continuously in the one direction along the material, and there is no bodily movement of the tool guide parallel to that one direction. In such embodiments, the inertia of the guide is not a limiting factor on the operating speed over any period of time, be it long or short. Once the tool driving mechanism has been set in motion it has merely to be kept in motion in the same sense, although it is not excluded that the tool or tools can, if required, be accelerated or decelerated, e.g. to match the trace speed of the tool or tools to an increase or decrease in the rate of advance of the sheet material through the cutting or marking station, or to modify the angle which the trace lines make with the line of motion of the sheet material.

Embodiments in which the work is moved and the tool guide is in a fixed position relative to the line of motion of the work, as above referred to, are applicable for cutting or marking a separate sheet or a plurality of sheets moving in succession along a given conveying path. Such embodiments are, however, of particular practical importance when the sheet material is a continuously manufactured ribbon of material, e.g. a ribbon of glass in continuous movement from a flat glass forming machine.

According to other embodiments of the invention, the sheet material is stationary and the tool guide is bodily displaced in the one direction along the material during successive traces. According to this embodiment, while one trace is being effected, the guide is already moving towards the position which it must occupy for the next trace. The mass of the tool guide and associated parts is not a significant limiting factor on the operating speed during the period of time taken for the guide to complete one "stroke", i.e. to move to the limit of its available path of travel in the one direction along the sheet material. Once the guide has been set in motion in the one direction, it can continue in motion throughout such period over a full stroke. During this stroke, a series of traces can be completed in rapid succession, due not only to the continuous displacement of the guide in the direction along the material in which the traces succeed one another, but also to the transport of the or each tool from the end of one trace to the beginning of another trace by the continued movement of the tool driving mechanism in one direction.

While particular reference has been made to embodiments of the invention in which the tool guide is stationary and the sheet material is in movement, and to embodiments in which the sheet material is stationary and the tool guide is in movement while the traces are made, it is to be understood that the invention includes embodiments in which the required relative movement between the sheet material and the tool guide in one direction along the sheet material is achieved by simultaneously displacing the sheet material and the tool guide. Such simultaneous displacement is useful for influencing the position along the sheet material at which a given trace or traces is or are effected for a given speed of movement of the sheet material or for a given speed of movement of the tool guide, while leaving other influencing factors such as the speed of the tool driving mechanism unchanged.

By way of example, when marking or cutting a continuously moving ribbon material, the tool guide may be displaced in the same direction as, but at a speed different from, the ribbon, or the tool guide may be displaced in the opposite direction to the ribbon, during or preparatory to the performance of a given trace or traces. In either case the position or positions at which the given trace or traces is or are made is or are modified due to the tool guide displacement.

According to a preferred feature, the trace lines extend across the sheet material from one edge thereof to the other. The sheet material is then marked off or divided into separate sections or pieces, as is required for most industrial uses of the invention. However, as will be later exemplified, it is not an essential feature of all embodiments of the invention for the trace lines to extend from one edge to the other of the material. In some cases such lines extend only part of the way across the sheet material.

Advantageously, while a tool is operative on the sheet material, the relative velocity V of the tool guide and the sheet material in the one direction along the material, the speed $v$ of such tool along its guide, and the orientation of the guide in relation to the one direction along the sheet material are such that the trace is straight. The making of straight traces is required for most purposes presently contemplated. Preferably the relative velocity V, the speed $v$ and the orientation are all constant during the making of each trace. All complications involved in relating the change of one variable to a change in another variable are thereby avoided.

However, in cases in which the value V is inevitably liable to vary, as for example when the work is a continuously moving ribbon of sheet material, it is preferable to keep the orientation of the guide constant during the making of successive traces and to maintain a constant ratio between the values V and $v$ by making the value $v$ dependent on V. This can be easily achieved by placing the tool driving mechanism under the influence of means responsive to variations in the value of V. Alternatively the value $v$ can be kept constant and the orientation of the tool guide can be varied in dependence on V. This procedure affords the advantage that the tool driving mechanism does not have to be capable of fine speed variations during operation.

Preferably the orientation of the guide and the ratio between the values V and $v$ are constant during the making of successive traces. In these circumstances the successive traces are parallel, which is in accordance with the requirements of most potential industrial uses of the invention.

According to certain important embodiments of the invention, the tool guide is disposed at an inclination angle $\alpha$ to the one direction along the sheet material and the factors V, $v$ and $\alpha$ are maintained in the relationship $V/v = \sine \alpha$. Those conditions ensure the marking off or cutting of rectangular areas of sheet material into rectangular sections or pieces. These are the most commonly set requirements in work of this kind.

However, the invention includes methods in which the tool guide is disposed normal to the one direction along the sheet material so that each trace is made at an inclination to the one direction along the sheet material. Such methods are useful for marking off or cutting the material into special shapes, for example areas or pieces in the form of parallelograms.

In the foregoing, consideration has mainly been given to embodiments in which the traces are straight. However, the invention includes a method in which the relationship between the values V and $v$ and the orientation of the tool guide are altered during the making of at least one trace. In such cases at least one of the trace lines changes direction at one or more points across the work.

The invention also includes methods in which the relationship between the values V and $v$ and the orientation of the tool guide is altered between the making of successive traces. Sections or pieces of sheet material of different shapes are then obtained in one and the same performance of the method.

According to another important feature, adjacent traces along the sheet material are made by different marking or cutting tools which are driven along the endless path while spaced one behind the other. This feature enables traces to be made in more rapid succession for a given speed of the tool driving mechanism.

Methods according to the invention are of particular importance for the marking or cutting of glass, e.g. sheets of drawn or rolled glass, known as plate glass, or sheet glass in the form of a continuously moving ribbon. Due to the ways in which flat glass is continuously manufactured, the glass has to be rapidly marked or cut in the flat glass production factory and this can be done in an efficient manner by means of the invention.

The invention also includes apparatus for use in marking or cutting sheet material along lines which are spaced apart in one direction along the material and which are at an angle to that direction, the apparatus being composed of a support for supporting sheet material to be marked or cut, a tool guide adapted to extend across, and parallel with, a face of the sheet material when it is so supported, a mechanism for bringing about relative displacement between the guide and the supported sheet material in a direction such that the line constituting the projection of the guide on the plane of the sheet material sweeps bodily along the material, at least one marking or cutting tool holder movable along the guide over an operational path for causing a marking or cutting tool to act on the material face, and a mechanism for driving the holder or holders along the guide, a novel feature of the invention being that the tool holder driving mechanism operates to drive at least one tool holder continuously along an endless or closed path, part of which coincides with the operational path.

Apparatus according to the invention possesses the advantage that successive traces at spaced intervals along an area of sheet material can be made by a tool or tools in a period of time in which such tool or tools is or are kept in continuous movement in one direction around the endless path.

Preferably the support for supporting sheet material to be marked or cut includes a sheet material conveyor for moving such sheet material relative to the tool guide. There is then no need for any bodily displacement of the tool guide during the making of successive traces.

The invention however includes apparatus in which the tool guide is mounted for bodily movement to bring about relative displacement, between such guide and the supported sheet material, in the one direction along the sheet material. Such apparatus can be used in cases in which it is not possible or not convenient for the work to be displaced during the making of the traces. In such apparatus, in which the tool guide is bodily movable, the sheet support may be constructed to permit it to transport the sheet material during the making of successive traces therealong if that should be required in any given situation.

According to a further advantageous feature, a control is provided for varying the speed of movement of the tool holder or holders along the endless path. By varying the speed of a tool or tools during the period taken for the making of a series of traces, the orientation of successive traces can be rapidly varied for a given orientation of the tool guide and a given relative velocity of the work and the tool guide.

According to a preferred feature, there is a control for varying the speed of the or each tool holder along the endless path in dependence on a variation in the relative velocity of the tool guide and the work. This feature enables parallel traces to be made notwithstanding variations in the relative velocity and without varying the orientation of the tool guide. Thus, there may be a work-supporting conveyor with a driving mechanism which is also responsible for driving the tool holder or tool holders along the endless path.

By way of example, the tool holder may be driven by the mechanism responsible for displacing the work, with a speed ratio controller interposed to permit the work/tool speed ratio to be varied. As a further example, there may be a work-supporting conveyor and the tool holder driving mechanism may include a motor coupled to a sensing device which is directly influenced by variations in the speed of the work and yields control signals ensuring that any variations are accompanied by appropriate changes in the speed of the tool holder along the endless path to maintain the work/tool speed ratio at a required value.

Advantageously, the tool guide is mounted in relation to the work support so that work can be cut or marked while the projected line of the guide on the work is at an inclination to the direction in which such line sweeps bodily along the work. Such apparatus can be used for marking off or cutting a rectangular area of sheet material into rectangular sections or pieces as hereinbefore referred to in relation to the marking and cutting methods according to the invention.

The invention also includes apparatus in which the tool guide is mounted in relation to the work support so that the work can be cut or marked while the projected line of the guide on the work is at right angles to the direction in which such line sweeps bodily along the work. Such apparatus can be used for making successive traces which are inclined with respect to the direction in which the work and the guide are relatively displaced during the making of successive traces.

Preferably the tool guide is mounted so that the angle between the projected line of the guide on the work and the direction in which the work and the guide are relatively displaced during the making of successive traces can be varied. Such apparatus has the advantage of versatility in regard to the marking or cutting operations which can be performed therewith.

In apparatus having means for varying the orientation of the tool guide as just referred to, it is advantageous to provide means for varying the orientation of the tool guide automatically in dependence on variation in the relative velocity between the sheet material and the tool guide. This feature enables parallel traces to be made notwithstanding variations in the relative velocity V, and without varying the speed $v$ of the tool along the guide.

According to a further advantageous feature, an adjustment device is provided for varying the relative velocity V of the work and the tool guide during a given working period in which successive traces are made. By varying such relative velocity, the spacing and the orientation of successive traces can be varied for a given speed $v$ of the tool along the guide and for a given orientation of the tool guide. In apparatus in which the work support is constructed for conveying the work, such adjustment device may consist of, or include, a mechanism for varying the speed of advance of the work. In apparatus in which the tool guide is bodily movable, such adjustment mechanism can include a unit for varying the speed of bodily movement of such tool guide.

Preferably the apparatus includes a plurality of tool holders which can be driven in spaced tandem relationship along the endless path so that successive traces can be made by successive tools, which promotes rapidity of operation.

In certain apparatus according to the invention the tool holder driving mechanism includes at least one rotatable endless propelling member to which the tool holder or holders is connectable so that the rotation of such propelling member or members causes the tool holder or holders to traverse the endless path. In some of these embodiments there is at least one tool holder which is permanently attached to such an endless propelling member. This feature is conducive to a very simple construction of the tool holder driving mechanism. However, the invention also includes apparatus in which there is at least one tool holder which can be momentarily disconnected from an endless propelling member at any required moment of time by means of a releasable coupling, e.g. an electromagnetic clutch. In the case that there is more than one tool holder, the provision of a releasable coupling or couplings enables the tandem spacing of such holders to be varied at will.

According to a particular embodiment, the apparatus includes two such endless tool holder propelling members, each having at least one tool holder connected or connectable therewith, a mechanism for driving the propelling members continuously in one direction and at the same speed, and a control for causing the speeds of such members to be made to differ temporarily so as to alter the tandem spacing of tool holders propelled by the different propelling members. By way of example, in one embodiment, one of the endless propelling members is provided with a driving mechanism whereby it is continuously and positively driven when the apparatus is in use, and a coupling, e.g. of magnetic or electrical type, is provided for releasably coupling the other propelling member to such continuously driven member.

A suitable endless tool holder propelling member is one in the form of an endless chain, band, wire or the like looped around suitable driving wheels.

As an alternative to the use of an endless propelling member or members, apparatus according to the invention may incorporate a tool holder driving mechanism which operates to drive the tool holder along the required endless path by electromagnetic forces.

According to a further advantageous feature, apparatus according to the invention includes a mechanism for temporarily displacing at least the tool-holding head of the or each tool holder during its movement along the endless path so that such head is shunted from its operational path. By that means it is possible, even though a tool holder be continuously driven along the endless path, to prevent a tool held by such holder from acting on the work during any selected traversal of such course. By operating such tool holder displacing mechanism at a selected time or times during the operation of the apparatus, the spacing of successive traces made by a given tool can be varied. By way of example, provision can be made for displacing at least the head of a tool holder by constructing the tool holder of relatively movable body and head sections and by providing for the head section a displaceable cam track which can be displaced into a position in which it constrains the head section to be shunted from its operational path.

Means may be provided for automatically rendering a given tool or tools operative according to a predetermined schedule or to achieve a predetermined marking or cutting program. For example, apparatus according to the invention may incorporate, or be linked to, a computer programmed to determine appropriate positions along the work for the different traces, taking into account the required sizes of the sections or pieces into which the work is to be marked or cut, as instructed by a particular source or sources, and possibly also taking into account the positions on the work of defects which may be incompatible with quality standard specifications predicated for the final sections or pieces.

The actual type of the tool or tools employed when using apparatus according to the invention will be selected according to the nature of the sheet material and the operation to be performed by the tool. For cutting glass, cutter wheels or diamonds may be employed. Where "cutting" is referred to, this includes mere surface cutting, i.e. scoring.

DESCRIPTION OF THE PREFERRED EMBODIMENTS

Figure 1:
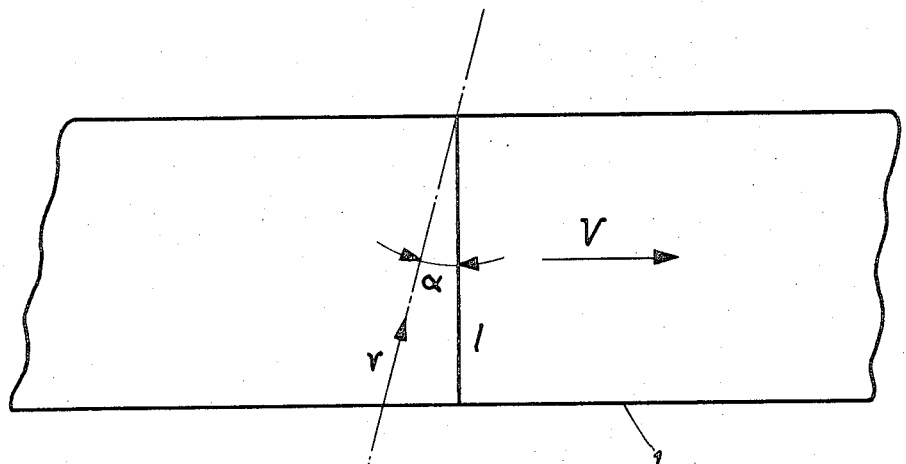
FIG. 1 is a diagram illustrating the relative displacements of a ribbon and a tool during cutting of the ribbon.

FIG. 1 illustrates the basic relations involved in the present invention. In performing a particular method according to the invention, a ribbon of glass 1 is transversely cut or marked along lines normal to the longitudinal axis of the ribbon while it is continuously displaced along the longitudinal axis at a velocity V in the direction indicated by the horizontal arrow. During this displacement of the ribbon, a cutting tool is displaced at a velocity $v$ in a direction oblique to the ribbon path, as represented by the oblique arrow. The velocities V and $v$ are related according to the equation $V/v = \sin \alpha$, where $\alpha$ is the angle between the guide path of the tool and a line $l$ normal to the longitudinal axis of the ribbon. In these circumstances, the tool traces across the ribbon a line which is normal to its longitudinal axis. As the ribbon continues to advance, it is cut transversely at one or more other positions along its length by the same and/or by one or more other cutting tools displaced along the oblique guide path.

Figure 2:
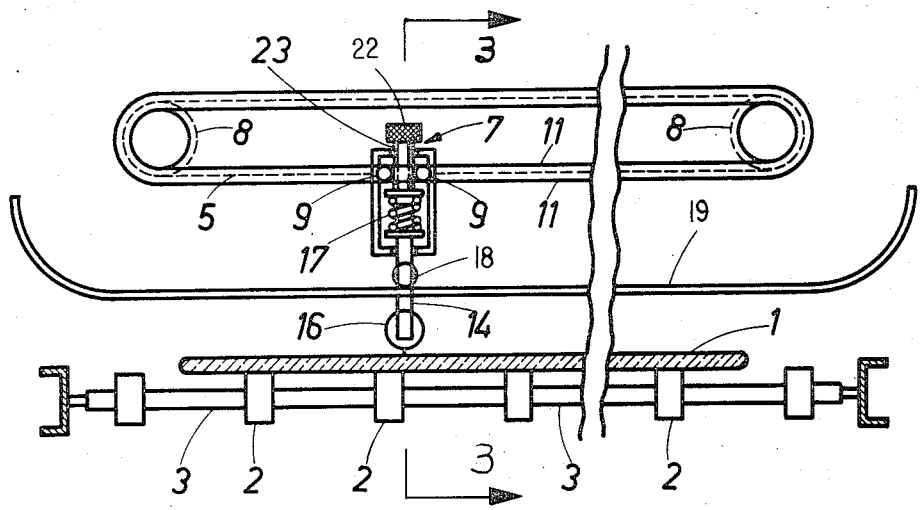
FIG. 2 is a side elevational view of part of an apparatus according to the invention.
Figure 3:
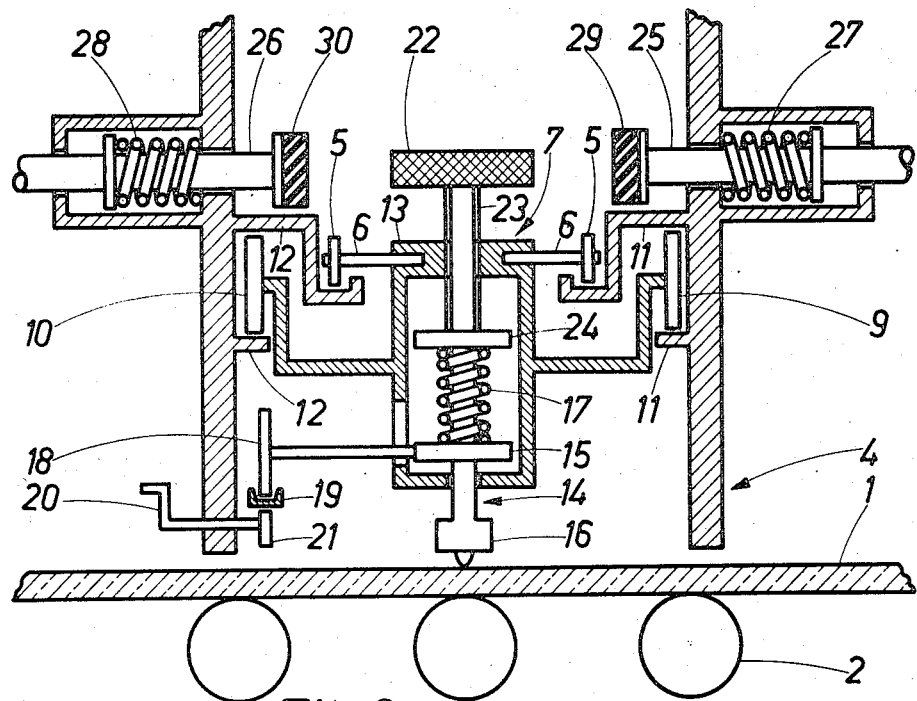
FIG. 3 is a cross-sectional view taken along line 3—3 of FIG. 2.

The cutting of a ribbon as above described can be performed by apparatus of the type shown in FIGS. 2 and 3.

This apparatus includes a work support in the form of a plurality of rollers 2 mounted on spaced parallel shafts 3.

Above the work support there is a tool guide 4 shown in FIG. 3. This guide is arranged to extend obliquely to the path along which the ribbon 1 is displaced on the rollers 2. However, in FIG. 3 the guide is shown to be normal to the ribbon path, in the interest of simplifying the drawing. The guide structure is omitted in FIG. 2.

The guide 4 supports a tool driving mechanism composed of two endless chains 5 rotatably supported in spaced vertical planes by sprocket wheels 8. At directly facing points on the chains 5 they carry lateral pins 6 which support a tool holder 7. This tool holder has side arms which rotatably support rollers 9 and 10 which run along tracks formed by internal flanges 11 and 12 on the side walls of the guide 4. In this way the tool holder is stably supported during the cutting operations.

The tool holder 7 includes a hollow body section 13 which is connected to the endless chains 5, and a head section 14 composed of a disc portion 15 which is accommodated within the body section 13 and a stem portion which projects from the body section and carries a cutting tool 16. The head section 14 is urged downwardly relative to the body section 13 by a helical spring 17.

The disc portion 15 carries a lateral arm which projects through a slot in the wall of the body section 13 and which rotatably supports a roller 18. The extent to which the head section 14 of the tool holder projects from the body section 13 under the force exerted by the spring 17 is determined by the position of a rail 19. This rail is mounted on the guide 4 in such a way that the rail can be lowered or raised by turning a control member 20 carrying a cam 21 which engages the rail 19.

When the rail is in its lowered position the tool 16 makes effective contact with the ribbon 1 during movement of the tool holder along the path of the lower reach of the chains 5. When the rail is in its raised position, the tool travels over, but out of contact with, the work during such movement of the tool holder.

The pre-loading of spring 17 can be adjusted by turning an adjusting screw 22 having a threaded stem 23 which engages a female thread in the top of the body section 13 of the tool holder and which carries a bearing disc 24 which bears on the spring 17.

Opposed plungers 25 and 26 project inwardly from the side walls of the guide structure 4. These plungers can be displaced inwardly in the direction of their axes against the pressure of springs 27 and 28 surrounding the plunger stems. The head portions of the plungers are covered with pads 29 and 30 of a material having a good coefficient of friction, e.g. rubber. The plungers 25 and 26 are disposed at a level which corresponds with the level at which the knurled head of the adjusting screw 22 travels along the guide structure 4 during movement of the tool holder 7 along the lower reach of the chains 5.

By means of an automatic mechanism (not shown), either of the plungers 25 and 26 can be depressed, against the action of its spring 27 or 28 as the case may be, to bring the plunger head into contact with the knurled head of the adjusting screw 22 during the movement of the tool holder. If plunger 25 is moved into contact with the head of the adjusting screw, this screw is screwed into the body of the tool holder to an extent which depends on the length of time for which the plunger is depressed, thereby to increase the loading of spring 17 and consequently to cause the cutting tool 16 to be pressed more firmly against the ribbon of glass. If plumber 26 is moved into contact with the head of the adjusting screw 22, the screw is rotated in a direction such that the loading of spring 17 is somewhat relaxed so as to decrease the pressure of the cutting tool against the glass.

In the apparatus shown in FIGS. 1 and 2, there could be more than one tool holder connected to the chains 5. In that case the head sections of the two or more tool holders may be displaceable by one of more guide rails such as rail 19 so that the two or more tools can together be rendered inoperative during one or more revolutions of the carrier chains 5. Alternatively, there may be a rail such as rail 19 for each tool holder and the rails may be independently displaceable so that any one tool or any number of the tools can be rendered inoperative for any given period of time while the other tool or tools remain operative. Such an apparatus can be used for cutting a ribbon into sections of a given modular length or into sections which are multiples of that length, while the ribbon and the endless chains 5 are driven at constant speeds. The modular length is a function of the spacing between adjacent tool holders on the chains 5, which spacing in the particular apparatus shown in FIGS. 1 and 2 cannot be varied.

Figure 4:
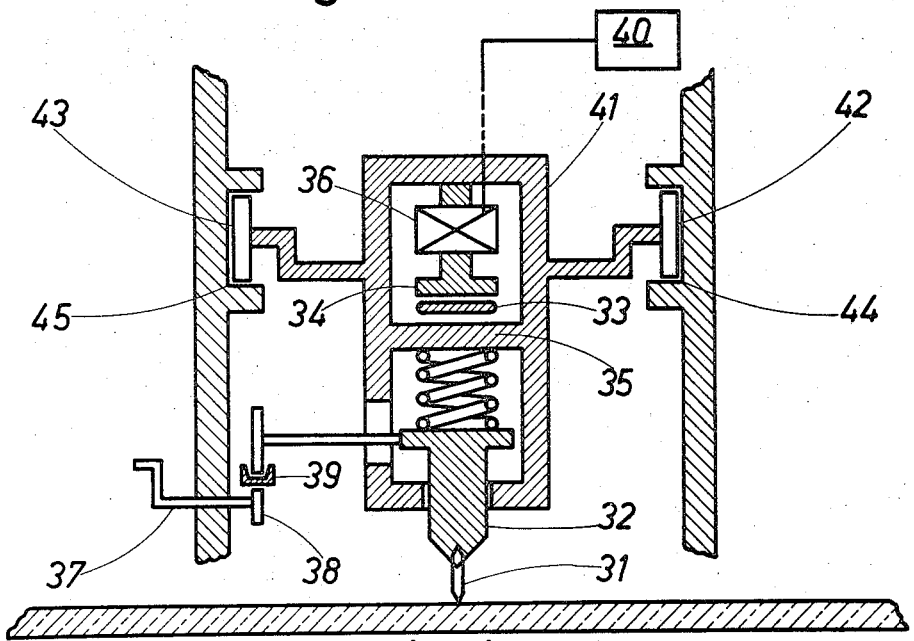
FIG. 4 is a cross-sectional elevational view of a modified form of construction of the apparatus of FIGS. 2 and 3.

FIG. 4 shows a tool holder driving mechanism incorporating an endless propelling member and a clutch control permitting the position of the tool holder along such member to be varied. A cutting tool 31 is held by the head section 32 of the tool holder and the hollow body section 41 of this holder is traversed by the lower reach of an endless metal band 33. The upper reach of this band is not shown in the drawing. The portion of band 33 within the tool holder is between a clutch plate 34 and a fixed transverse web 35 of the tool holder. The clutch plate 34 is controlled by a solenoid unit 36 secured to the body section 41 of the tool holder.

The solenoid is coupled to a control box 40 via which the solenoid coil can be energized to cause a ferromagnetic core piece carrying the clutch plate 34 to be retracted into its illustrated position in which the band 33 is free to travel through the tool holder. When the coil is de-energized the clutch plate descends under the combined effect of gravity and the force exerted by a compression spring (not shown) to clamp the band 33 against the web 35 and thereby cause the tool holder to be propelled by the band 33 for as long as the solenoid coil remains de-energized.

The head section 32 of the tool holder is loaded by a helical spring and is vertically displaceable against the spring pressure by moving a control arm 37 to cause a cam 38 to lift a rail 39 which is engaged by a roller mounted on a laterally projecting arm on the head section 32.

Rollers 42 and 43 on the body section 41 of the tool holder engage in guide tracks 44 and 45 on the guide structure so that the tool holder is stably supported within the guide. The apparatus may incorporate two or more tool holders as shown in the drawings, the tool holders being propelled by the same endless band. By momentarily disengaging the clutches of one or more tool holders, the spacing between adjacent tool holders can be varied so as to vary the spacing along the ribbon of successive cuts for a given speed of the ribbon and a given speed of the endless band.

Figure 5:
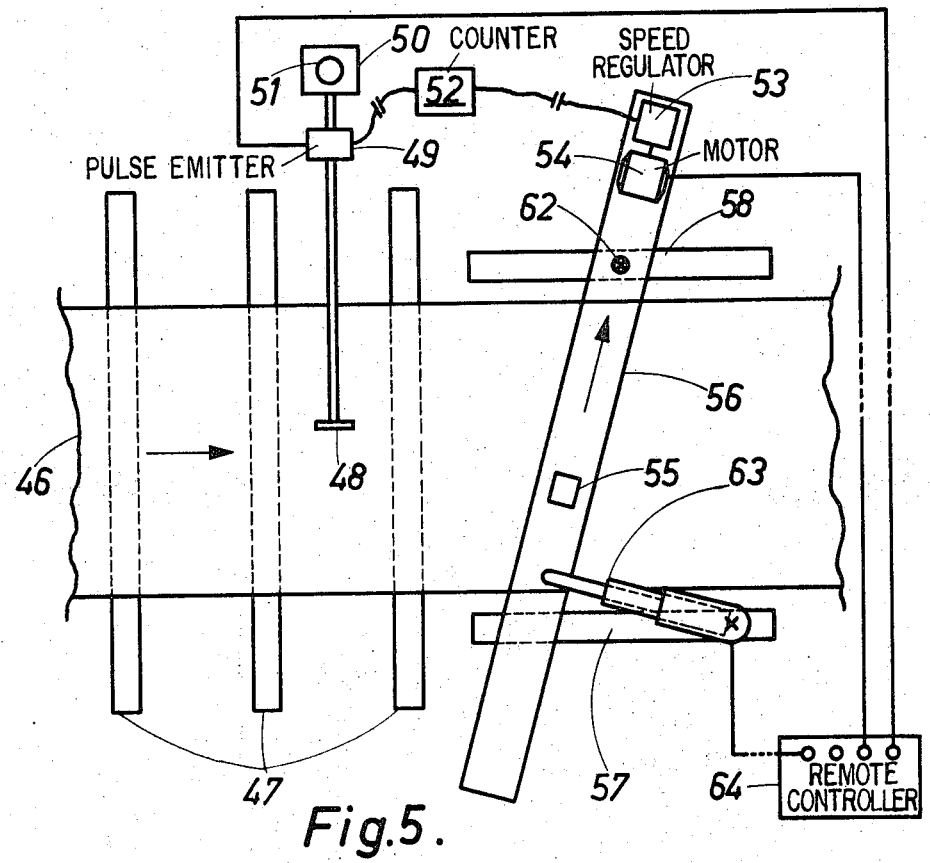
FIG. 5 is a plan view showing the arrangement of parts of an apparatus according to the invention incorporating a mechanism for synchronizing the speed of displacement of the work and the speed of displacement of the cutting or marking tool.

The speeds of the glass ribbon and the endless tool propelling member or members, such as the chains 5 in the apparatus of FIGS. 2 and 3, or the band 33 in the apparatus of FIG. 4, can be maintained in a predetermined ratio by a synchronizing mechanism as illustreated in FIG. 5. In this figure, a ribbon of glass 46 is supported on transverse rollers 47 and is continuously conveyed in the direction indicated by the horizontal arrow. A friction roller 48 is disposed in contact with the ribbon so that the roller is rotated at a speed which is at all times dependent on the speed of advance of the ribbon. The roller 48 is fixed to a spindle which extends into an electrical pulse emitter 49 which emits electrical pulses at a pulse repetition rate which is proportional to the speed of the ribbon. The emitter 49 is connected to a support 50 which is vertically displaceable under the control of an adjustment screw 51 so that the level of the roller 48 can be accurately set to make correct contact with the work.

The pulse output from the emitter is transmitted to a counter 52 which is electrically connected by a flexible cable to a speed regulator 53 of an electric motor 54 responsible for driving the endless propelling member or members responsible for propelling the tool holder or holders 55 along the guide 56. The electric motor 54 and the speed regulator 53 are mounted on this guide.

The guide 56 is connected to supports 57 and 58, located abreast of the path of the glass ribbon, in such a way that the guide can be turned about a vertical axis 62 so as to vary the angle of inclination of the guide relative to a line normal to the direction of the ribbon movement. The angular movement of the guide is effected by a hydraulic piston and cylinder unit 63 extending between the guide structure and the support 57.

The piston and cylinder unit is double-acting and the guide can be positively angularly displaced through a predetermined angle in either direction by controlling a reversible electric pump (not shown) which supplies fluid to the unit 63. The control of the electric pump is effected from a remote controller 64 which is also coupled to the electric motor 54 so that the angular setting of the guide can be properly related to the speed at which the tool or tools is or are propelled along this guide.

The moving glass ribbon 46 can be cut or marked along lines which are perpendicular to the longitudinal axis of the ribbon by pre-setting the guide 56 at a given angle of inclination and driving the endless tool-propelling member at a certain speed in relation to the speed of advance of the ribbon. By establishing a different ratio or ratios between the tool and ribbon speeds, the ribbon can be cut or marked along curved lines or lines which are at other than a right angle to the longitudinal axis of the ribbon, without changing the angle of the guide.

For a given speed of the ribbon, there are two parameters determining the track of the tools across the work, these being the speed of the tools along the guide and the guide inclination. For marking or cutting a ribbon along lines at a given angle to the longitudinal axis of the ribbon, the counter 52 can be regulated so that the speed of the tool holder or holders 55 along the guide is at all times in a constant relationship to the speed of the ribbon, the angle of the guide remaining constant. However for some purposes, e.g., the cutting of glass, there is an optimum tool speed relative to the work and if the speed of the ribbon is liable to vary considerably over a period of time, the guide angle can be varied with variation in the ribbon speed in order to permit the operative speed of the tool to remain optimum or to avoid having to depart too much from such optimum tool speed.

On the other hand, in some cases it is advantageous to keep the guide at a small angle of inclination, for example, in order to avoid skidding of the tool along the work and possible consequent breakage of the work, and the fact that the tool speed can be varied enables greater variations in the ribbon speed to be compensated for than would otherwise be possible while keeping the guide angle variation within acceptable limits. The controller 64, to which the mechanisms responsible for controlling the guide angle and the tool speed are electrically connected, permits one or the other or both of the two parameters to be regulated as a function of the ribbon speed.

By way of example, an apparatus was equipped with six cutting tools located at intervals of 2.25 meters on an endless propelling member having a total length of 13.50 meters and was used for cutting, into rectangular sections 1.2 meters in length, a continuous ribbon of glass which had a width of 3.75 meters and which was continuously advanced on a system of conveying rollers at a speed of 4.90 m/min. For this purpose, the guide was disposed at an angle of 32°20′ to a line normal to the longitudinal axis of the ribbon, the endless propelling member was rotated at a linear speed of 0.153m/sec. and all the tools were operative during every revolution of the propelling member.

By operating the machine in the same way but with every other tool rendered inoperative, thus leaving three tools operative and located at intervals of 4.5 meters, leaving other conditions unchanged, the ribbon was cut into sections 2.40 meters in length.

Apparatus as described and illustrated can be used for marking glass or other material by fixing a marking took, such as a stick of coloring material, in the or each tool holder in place of the cutting tool. As an alternative the head portion of the or each tool holder can be replaced by an appliance which delivers a jet of marking fluid such as ink.

As an alternative to an electric synchronizing system as shown in FIG. 5, a speed synchronizing mechanism can be used which is composed of mechanical coupling between the ribbon conveying mechanism and the driving mechanism for the endless tool propelling member or members. For example, the ribbon conveyor can be driven via a transmission shaft which also serves to drive the endless tool propelling members via an appropriate transmission mechanism.

Figure 6:
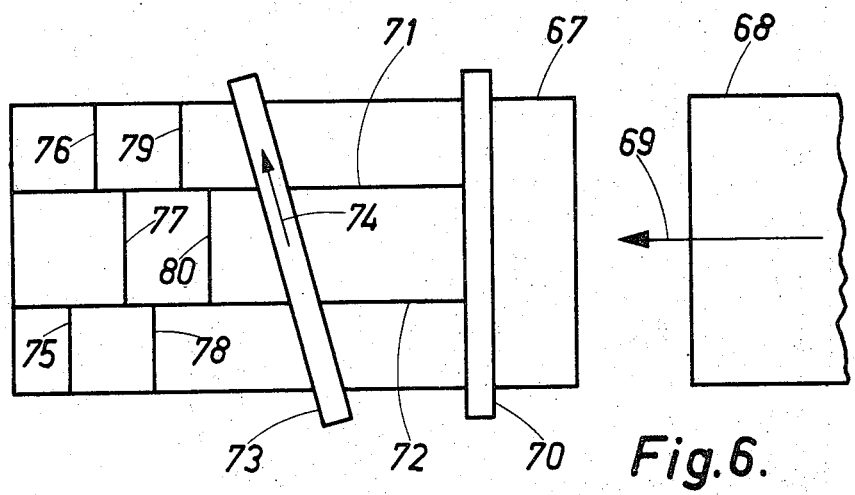
FIG. 6 is a plan diagram illustrating the performance of a particular method according to the invention.

FIG. 6 illustrates the cutting of successive sheets of material by a method according to the invention. The figure shows two sheets of glass 67 and 68 in the course of being conveyed one behind the other in the direction of the horizontal arrow 69. Two cutting devices are mounted above the path of the sheets.

The first device is composed of cutter supporting beam 70 which is disposed perpendicularly to the direction of movement of the sheets and carries two cutting tools (not shown) which are at fixed positions along the beam and serve to cut the sheets longitudinally along lines 71 and 72 whereby the sheets become divided into three parallel longitudinal sections or strips as the sheets pass beneath the beam 70.

The second cutting device includes a guide beam 73 disposed downstream from the beam 70, with respect to the sheet conveying direction, and operates according to the invention to cut the longitudinal strips of glass into successive sections. The cutting device incorporating the guide 73 can have the general form of the apparatus illustrated in FIGS. 2 and 3.

Preferably the apparatus includes a plurality of tool holders fitted with cutting tools. The or each tool holder is driven over an endless path along the guide 73 so that each cut is made while the tool is moving in the direction of the oblique arrow 74. The angle of inclination of the guide 73 and the speed of the tools relative to the speed of the ribbon are such that the longitudinal strips are divided into sections along lines perpendicular to the lines 71 and 72.

The second cutting device, which includes the guide 73, can be used for cutting the glass along lines extending from one side edge of the sheets to the other so as to sever the longitudinal strips transversely at identical positions along their lengths, i.e. along continuous lines perpendicular to the lines 71 and 72. However, in the example shown in the drawing, the tools are controlled by control devices, e.g. by control members such as the control arm 20 of FIG. 3, so that during a given revolution of the tool propelling member, each tool cuts across only one of the strips into which the sheets 67 and 68 are divided. According to one possible cutting program, the cuts 75, 76 and 77 are made by three tools during one rotation of the tool propelling member and the cuts 78, 79 and 80 are made by the same tools during the next rotation of such member, successive cuts in each longitudinal strip being made by the same tool. However, other apportionments of the cuts between the different tools are possible.

The cutting program which is effected using control members 20 of FIG. 3, or otherwise, can be worked out to provide, as a result of the cutting operations, pieces of glass having a range of different sizes required for a given purpose and in such a way as to take account of the positions of any local defects which may be present in the sheets to be cut. If the final pieces have to be of a quality standard which precludes the presence of such defects, then the program must be formulated so that pieces of glass containing the defects are eliminated. This operation could be carried out, for example, under control of systems such as those disclosed in U.S. Pat. No. 3,490,143 issued to Edgard Brichard et al. on Jan. 20, 1970 and U.S. Pat. No. 3,503,290 issued to Jean-Adolphe Valembois and the present applicant on Mar. 31, 1970.

Figure 7:
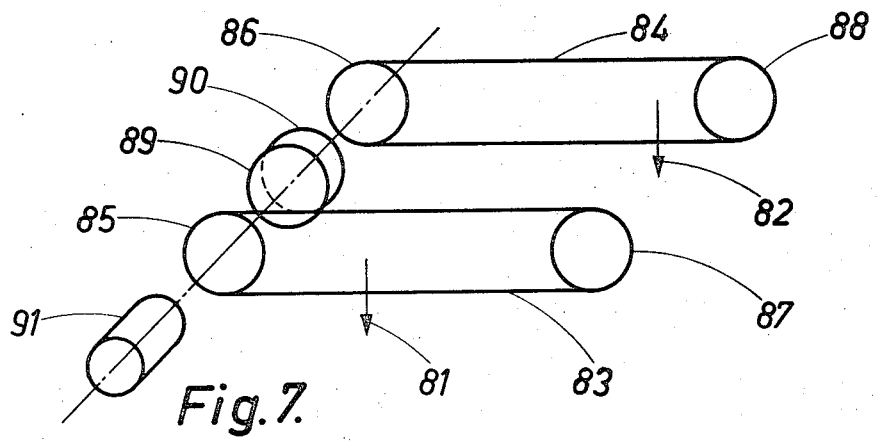
FIG. 7 is a diagram of another form of tool driving mechanism for driving a plurality of tools simultaneously.

A form of tool driving mechanism alternative to those so far described and illustrated is shown in FIG. 7. This mechanism employs different endless propelling members for propelling different tools. Two tools are represented, tools 81 and 82, which are respectively propelled by endless propelling members 83 and 84 which travel around sprockets 85, 86, 87 and 88. Sprockets 85 and 86 are driven by aligned shafts which can be coupled by clutch plates 89 and 90 actuated by a controller 91.

When the clutch plates are engaged, the two endless propelling members rotate in unison and the tools 81 and 82 make cuts at positions which are spaced along the work by a distance which in part depends on the distance between the two tools measured in the direction of their lines of motion. This spacing of the tools can be varied by temporarily disengaging the clutch plates so that one of the members 83 and 84 is driven relative to the other for a short period of time. This period of time is predetermined so as to bring the tools to the required spacing and the clutch controller 91 is actuated accordingly. It is evident that each of the propelling members 83 and 84 can, if required, carry a plurality of tools.

Figure 8:
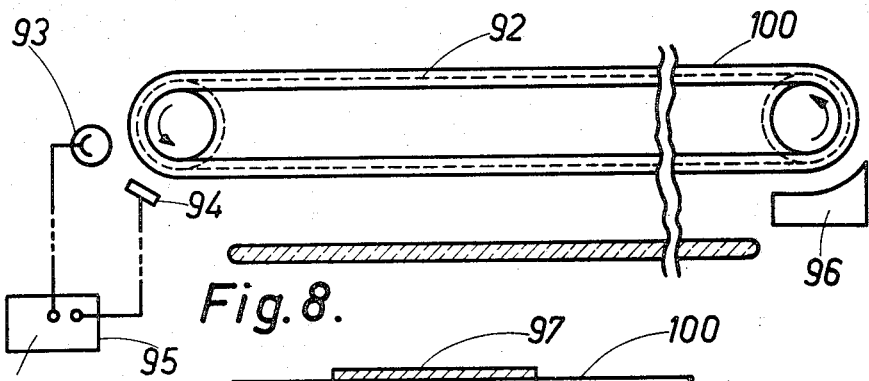
FIG. 8 is a side elevational view of part of another apparatus according to the invention.
Figure 9:
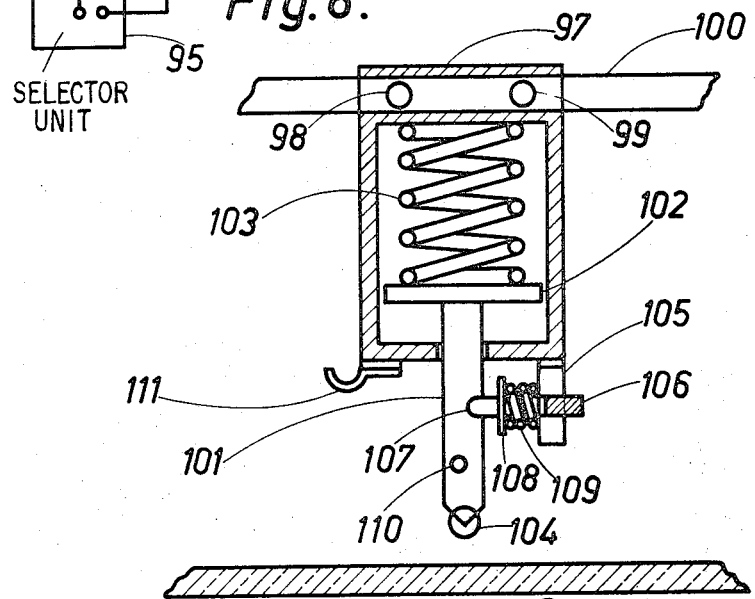
FIG. 9 is a view to a larger scale of part of the apparatus shown in FIG. 8.

The cutting apparatus illustrated in FIGS. 8 and 9 employs an endless tool-propelling member 92 for propelling a plurality of tool holders. The tool holders have been omitted from FIG. 8 but one of them is shown in FIG. 9. The tool holders are permanently connected to the propelling member. The propelling member is rotated in the direction indicated by the arrows in FIG. 8.

At that end of the route of the member 92 at which the tool holders commence their travel immediately over the sheet material to be cut, there is a sensing device 93, such as a photoelectric cell, which signals the passage of a tool holder. This cell is electrically connected with a triggering device 94 via a selector unit 95. At the other end of the route of the member 92 there is a fixed cam 96.

Each tool holder includes a body section 97 on each side of which there is a pair of rollers, such as 98 and 99, which run in endless tracks, such as track 100, so that the tool holder is stably supported. The tool holder also includes a head section composed of a central pin 101 which projects through a hole in the lower end of the body section 97 and a plate 102 to which that pin is secured and which is accommodated within the body section 97. The head section is subjected to a downward force by a compression spring 103 which bears against the plate 102 and which, when the head section is released from its illustrated retracted position, as will presently be described, serves to press the cutting tool 104 against the work.

The body section 97 of the tool holder carries a solenoid composed of a coil 105 and a core 106 of which the portion within the coil is made of ferromagnetic material. The end of the core pointing towards the pin 101 of the tool holder head is of generally coinical shape and when the tool holder head is in its retracted position, this end of the core engages in a recess 107 in the pin under the pressure exerted by a helical spring 109 which bears at one end against the housing of the coil 105 and at the other end against a collar 108 on the core. A roller 110 is rotatably mounted on the pin 101 of the tool holder head. The body section 97 of the tool holder supports a switch 111 which is electrically connected to the coil 105 and to a source of electric current (not shown).

The apparatus functions as follows:

The head sections of all the tool holders on the endless propelling member 92 are normally in their retracted positions as illustrated in FIG. 9. The selector unit 95 receives information from a source (not shown) indicative of the positions along the work at which cuts are to be made. This information is given in function of intervals of time between successive cuts, taking into account the speed of conveyance of the work. The sensing device 93 yields to the selector unit a signal each time a tool holder passes in front of it.

When a tool holder is about to commence a traverse of the lower reach of the member 92 at a moment such that the corresponding tool, if operative, would cut the work at one of the required positions along its length, within permissible tolerances, the signal yielded by the sensing device 93 as that tool holder passes in front of it is translated by the selector unit 95 into an actuating pulse to the triggering device 94. In consequence, this triggering device is temporarily displaced so as to close the switch 111 on the tool holder and thereby to energize the solenoid coil 105. This causes the core 106 to be retracted from the recess 107 in the pin 101. As a result, the head section descends under the pressure of spring 103 to move the cutting tool 104 into position for cutting the work.

When the tool holder has completed its operative traverse across the work, the roller 110 on the pin 101 encounters the fixed cam 96 which, as the tool holder passes by, forces the head section of the tool holder into its retracted position, where it becomes locked by the solenoid core 106 which shifts into engagement with the locking recess 107 under the action of spring 109.

Figure 10:
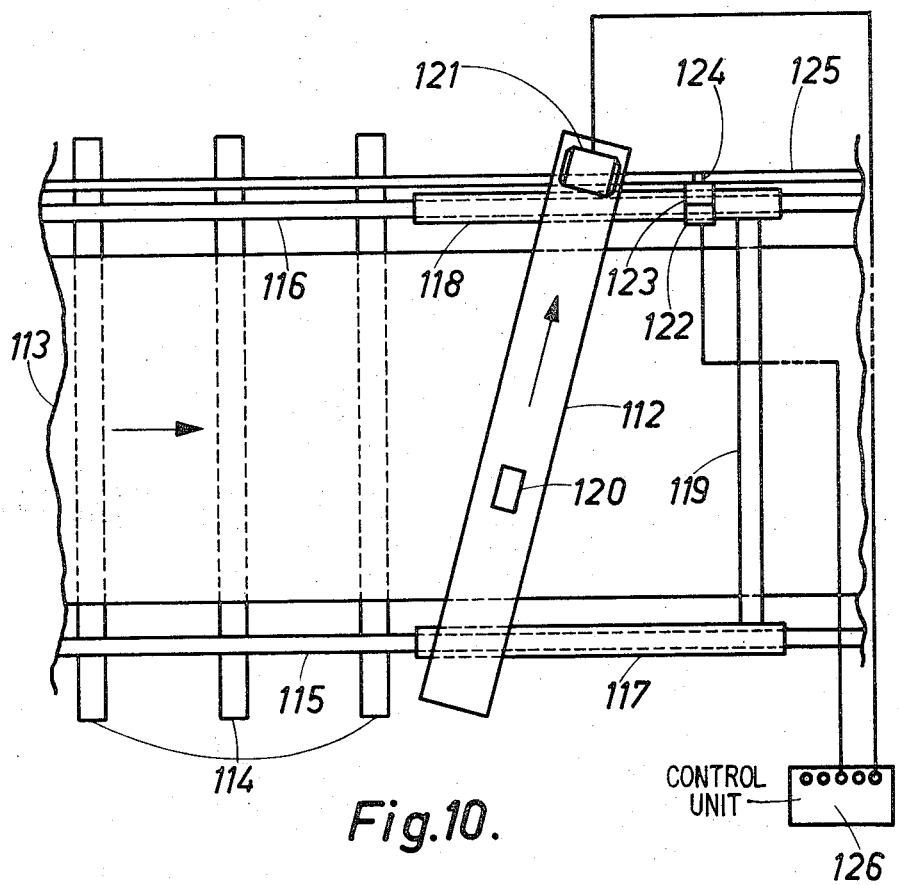
FIG. 10 is a plan view of another apparatus according to the invention.

FIG. 10 shows an apparatus according to the invention which marks or cuts sheet material at successive positions while the sheet material is stationary. The apparatus includes a guide beam 112 disposed obliquely across the work, e.g. a sheet of glass 113, supported on conveying rollers 114 which are stationary during cutting of the sheet. The guide beam 112 is bodily displaceable in the direction of the longitudinal axis of the sheet 113, i.e. normal to the axes of the rollers 114. For this purpose two guide rails 115 and 116 are provided abreast of, and parallel with, the sheet 113 and the guide beam 112 is mounted on a wheeled carriage composed of side members 117 and 118 on which the carriage wheels (not shown) are mounted, and a cross bar 119 interconnecting the side members.

A pair of endless tool-holder propelling chains (not shown) are rotatably mounted in the guide beam 112 and carry a plurality of tool holders at spaced positions. Only one of the tool holders, 120 is shown in the drawing. The endless chains are driven by a motor 121 also mounted on the guide beam.

The side member 118 of the frame supporting the guide beam carries a further electric motor 122 which, through a gear box 123, drives a pinion 124 which is in engagement with a rack 125 fixed alongside the guide rail 116 so that rotation of the pinion 124 causes the guide beam carriage to be driven along the guide rails. The electric motors 121 and 122 are energized via a control unit 126 which, for a given inclination of the guide beam relative to a line normal to the rails 116 and 117, regulates the speed of displacement of the guide beam carriage in relation to the speed of displacement of the cutting tools by the motor 121 to ensure that the traces made by the tools have the required direction across the sheet 113, e.g. a direction perpendicular to its longitudinal axis.

By virtue of the inclination of the guide beam and the continuous unidirectional rotation of the tool holders, the apparatus shown in FIG. 10 permits cuts at successive positions along the sheet to be made in rapid succession. Depending on the number and spacing of the tool holders on the endless driving chains, a second transverse cut can be commenced while a first transverse cut is still proceeding, while a third cut can be commenced while the second is still proceeding, and so on.

Figure 11:
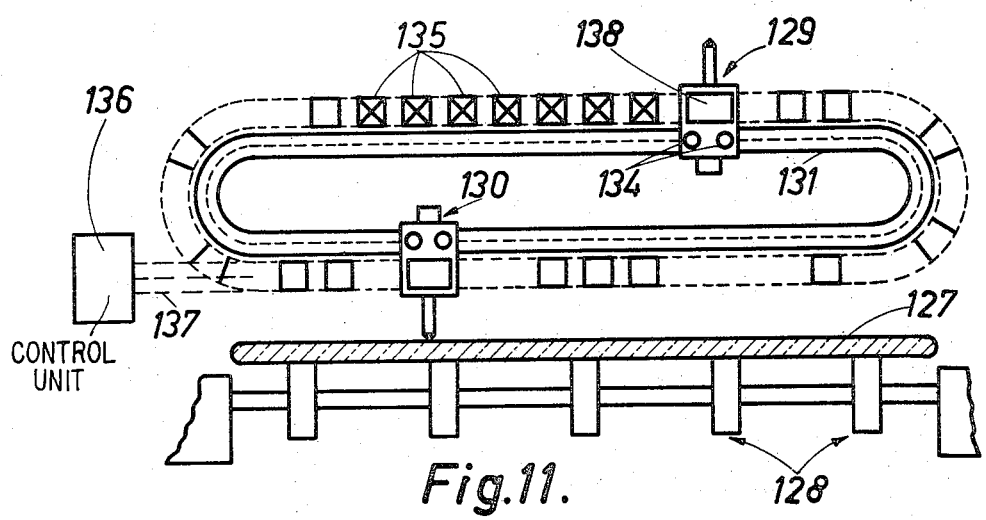
FIG. 11 is a side elevational view of part of another apparatus according to the invention.

The apparatus shown in FIG. 11 uses electromagnetic force for driving tool holders around on endless paths. A sheet or ribbon 127 to be marked or cut is supported on rollers 128 which can be rotated to advance the work during and/or after it has been marked or cut. Tool holders, such as 129 and 130, are provided at spaced positions along an endless track 131 composed of opposed guideways which are engaged by rollers, such as 134, on the tool holders. Adjacent the track 131 there is an endless series of electromagnet coils 135 which, when the apparatus is in operation, are fed from a control unit 136 and via conductors 137 with multiphase electric currents to create an electric field which travels along the endless path to be followed by the tool holders. The tool holders contain ferrogmagnetic core pieces 138 so that the tool holders are displaced along the endless path by the electromagnetic forces.

The tool holder heads can be displaceable to permit any given tool to be rendered inoperative for any required length of time in the same way as in the apparatus described with reference to FIGS. 2 to 4 or 8 and 9. An electromagnetic driving system as described with reference to FIG. 11 can be used in place of the mechanical driving system in any method as described with reference to the earlier figures.

Another solution to the problem with which the invention is concerned involves the use of a magazine of tools in which the tools are maintained ready for making a trace across the work. At any given moment, one or more tools in the magazine can be coupled to a tool propelling member so that such tool or tools is or are propelled across the work for making a trace or traces. In this case, it would not be essential for the tool propelling member to be in continuous movement. It would be possible, for example, to provide an endless tool propelling member which would be set in motion only at required moments of time, the movement of such member thus being intermittent.

The units 64, 95, 126 and 136 (respectively FIGS. 5, 8, 10 and 11) are constituted by electronic circuits well known by any those skilled in regulation and remote control.

It will be understood that the above description of the present invention is susceptible to various modifications, changes and adaptations, and the same are intended to be comprehended within the meaning and range of equivalents of the appended claims.

I claim:

1. Apparatus for tracing sheet material along lines which are spaced apart in one direction along the material and which are at an angle to that direction, comprising in combination: support means for supporting sheet material on which lines are to be traced, a guide disposed relative to said support means to extend across, and parallel with, a face of the sheet material when it is so supported and defining an endless path having a reach which extends adjacent, and parallel to, such face and which is inclined to the one direction along the material when it is so supported; drive means for causing relative displacement between said guide and the supported sheet material in the one direction, such that the projection on the sheet material of said reach sweeps bodily along the material; at least one tool holder movable along said reach of the path defined by said guide for causing a tool to trace lines on the material face, said tool holder including a head supporting a tool; a drive mechanism for driving said holder continuously around the endless path defined by said guide; and means disposed for temporarily displacing at least said head of said tool holder during its movement along said endless path for shunting said head from its operational position.

2. An arrangement as defined in claim 1 wherein said support means is connected to said drive means for moving the sheet material relative to said guide during the tracing of such material.

3. An arrangement as defined in claim 1 wherein said guide is connected to said drive means and mounted to be moved for establishing the relative displacement between said guide and the sheet material.

4. An arrangement as defined in claim 1 further comprising control means connected for varying the speed of movement of said tool holder around the endless path.

5. An arrangement as defined in claim 4 wherein said control means are arranged to vary the speed of said tool holder along the endless path in dependence on variations in the velocity of the relative displacement between said guide and the sheet material.

6. An arrangement as defined in claim 5 wherein said support means is constituted by a work-supporting conveyor equipped with a driving system constituting said drive means and said drive mechanism.

7. An arrangement as defined in claim 5 wherein said support means is constituted by a work-supporting conveyor, and said drive mechanism comprises a motor and a sensing device connected to said motor and disposed to be influenced by variations in the speed of advance of the sheet material in the one direction and to produce control signals which cause any such variations to be accompanied by an appropriate change in the speed of said tool holder along said endless path to maintain such speeds in a predetermined ratio.

8. An arrangement as defined in claim 1 wherein said guide is mounted in relation to said support means so that sheet material can have lines traced thereon while the projection of the line of said reach on such material is at right angles to the direction in which such line sweeps bodily along such material due to the relative displacement between said guide and the material.

9. Apparatus for tracing sheet material along lines which are spaced apart in one direction along the material and which are at an angle to that direction, comprising in combination: support means for supporting sheet material on which lines are to be traced, a guide disposed relative to said support means to extend across, and parallel with, a face of the sheet material when it is so supported and defining an endless path having a reach which extends adjacent, and parallel to, such face and which is inclined to the one direction along the material when it is so supported; drive means for causing relative displacement between said guide and the supported sheet material in the one direction, such that the projection on the sheet material of said reach sweeps bodily along the material; at least one tool holder movable along said reach of the path defined by said guide for causing a tool to trace lines on the material face; a drive mechanism for driving said holder continuously around the endless path defined by said guide; orienting means connected to said guide for varying the orientation of said guide in relation to the direction in which the projection on the sheet material of said reach sweeps along such material; and means connected for varying such orientation automatically in dependence on variations in the velocity of the relative displacement between the sheet material and said guide.

10. An arrangement as defined in claim 1 further comprising adjustment means connected for varying the velocity of the relative displacement between the supported sheet material and said guide during a working period in which successive lines are traced.

11. An arrangement as defined in claim 1 wherein there is a plurality of tool holders mounted to be driven in spaced tandem relationship along said endless path.

12. An arrangement as defined in claim 1 wherein said holder drive mechanism comprises at least one rotatable endless propelling member for causing said tool holder to traverse said endless path.

13. An arrangement as defined in claim 12 wherein said tool holder is permanently attached to said endless propelling member.

14. An arrangement as defined in claim 13 wherein said tool holder comprises releasable coupling means by which it is selectively connectable to said propelling member.

15. An arrangement as defined in claim 12 wherein there are two endless propelling members and two tool holders each associated with a respective one of said propelling members, and said apparatus further comprises means for driving said propelling members continuously in one direction and normally at the same speed, and means connected for temporarily varying the speeds of said propelling members so as to alter the tandem spacing between said tool holders propelled by said two propelling members.

16. An arrangemt as defined in claim 15 wherein one of said endless propelling members is provided with driving means for continuously and positively driving such member, and further comprising coupling means disposed for releasably coupling the other said propelling member to said one member.

17. An arrangement as defined in claim 1 wherein said drive mechanism constitutes means for driving said tool holder along said endless path by electromagnetic forces.

18. An arrangment as defined in claim 1 wherein said tool holder further comprises a body section movable relative to said head, and said displacing means comprises a displaceable cam track arranged to be displaced into a position in which it constrains said head to be shunted from its operational path.

19. An arrangement as defined in claim 1 wherein said tool holder holds a glass-cutting tool.

* * * * *